(12) United States Patent
Kurtz et al.

(10) Patent No.: US 11,674,461 B2
(45) Date of Patent: Jun. 13, 2023

(54) METHOD AND SYSTEMS FOR ENGINE BRAKING VIA COORDINATED EGR AND VGT ACTUATION

(71) Applicant: Ford Global Technologies, LLC, Dearborn, MI (US)

(72) Inventors: Eric Matthew Kurtz, Dearborn, MI (US); Shawn Spannbauer, Royal Oak, MI (US); Kyle Pohlkamp, Waunakee, WI (US); Michiel J. Van Nieuwstadt, Ann Arbor, MI (US); Curtis Michael Bauer, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/453,076

(22) Filed: Nov. 1, 2021

(65) Prior Publication Data
US 2023/0139973 A1   May 4, 2023

(51) Int. Cl.
*F02B 37/22*   (2006.01)
*F02D 41/00*   (2006.01)
*F02B 37/24*   (2006.01)
*F02D 41/02*   (2006.01)

(52) U.S. Cl.
CPC .......... *F02D 41/0077* (2013.01); *F02B 37/24* (2013.01); *F02D 41/0005* (2013.01); *F02D 41/0007* (2013.01); *F02D 41/0055* (2013.01); *F02D 41/0235* (2013.01); *F02D 2041/0265* (2013.01); *F02D 2200/0802* (2013.01); *F02D 2200/101* (2013.01)

(58) Field of Classification Search
CPC ............. F02D 41/0007; F02D 41/0077; F02D 41/0005; F02D 41/0055; F02D 41/0235; F02D 2200/0802; F02B 37/24
See application file for complete search history.

(56) References Cited

U.S. PATENT DOCUMENTS

| | | | |
|---|---|---|---|
| 6,594,996 B2 | 7/2003 | Yang | |
| 9,228,468 B2* | 1/2016 | Yezerets | ................. F01N 3/208 |
| 10,605,158 B2 | 3/2020 | Kurtz | |
| 10,605,159 B2* | 3/2020 | Kurtz | ......................... F01B 7/14 |
| 11,421,619 B2* | 8/2022 | Prochazka | .............. F01N 13/10 |
| 2003/0178002 A1 | 9/2003 | Israel et al. | |
| 2015/0107553 A1 | 4/2015 | Bartkowicz et al. | |
| 2019/0085758 A1* | 3/2019 | Kurtz | .................... F02D 41/005 |
| 2020/0240424 A1* | 7/2020 | Vijayakumar | .......... F02B 37/22 |

FOREIGN PATENT DOCUMENTS

WO   0218761 A1   3/2002

* cited by examiner

*Primary Examiner* — Gonzalo Laguarda
(74) *Attorney, Agent, or Firm* — Vincent Mastrogiacomo; McCoy Russell LLP

(57) ABSTRACT

Methods and systems are provided for controlling an EGR valve and VGT vanes during engine braking. In one example, a method may include during an engine braking event in an engine, coordinating adjustments of both of a cross-sectional area of an inlet of a turbine and an opening of a valve of an exhaust gas recirculation (EGR) system to achieve a desired braking power and to maintain an exhaust system temperature above a threshold temperature during the engine braking event.

17 Claims, 8 Drawing Sheets

METHOD AND SYSTEMS FOR ENGINE BRAKING VIA COORDINATED EGR AND VGT ACTUATION

FIELD

The present description relates generally to methods and systems for engine braking of a vehicle.

BACKGROUND/SUMMARY

An aftertreatment device, such as a diesel oxidation catalyst (also referred to herein as DOC or as a "catalyst"), may be included in an exhaust system of a vehicle to treat gas components exhausted from an engine prior to emission from the vehicle via a tail pipe. For example, the catalyst may oxidize hydrocarbons and carbon monoxide and reduce particulate matter. The catalyst achieves higher emission reduction while operating above a predetermined temperature (e.g., a light-off temperature). Thus, undesirable vehicle emissions may occur during conditions that lower a temperature of the catalyst below the predetermined temperature. For example, engine braking may decrease the catalyst temperature. To perform engine braking, an engine is operated without fuel and a variable geometry turbocharger (VGT) may be clamped to produce high engine back pressure, thus increasing engine pumping work to increase generated braking power. Additionally, braking power is generally increased when engine airflow is increased; however, the increased airflow through the engine leads to rapid cooling of the aftertreatment device. As a result, when fueled operation of the engine is resumed, the cooled aftertreatment device may not be able to efficiently treat emissions from the engine. Thus, emissions leaving the vehicle may be increased.

In one example, the issues described above may be addressed by a method for, during an engine braking event in an engine, discontinuing combustion in the engine and generating a requested braking torque of the engine braking event by coordinating adjustments of both of a cross-sectional area of an inlet of an exhaust turbine and an opening of a valve of an exhaust gas recirculation (EGR) system to maintain an exhaust system temperature above a threshold temperature during the engine braking event. In this way, an exhaust system (e.g., a catalyst) of the vehicle may be maintained above its light-off temperature to effectively treat emissions from the engine when combustion is resumed.

As one example, when a demanded braking torque is low, the cross-sectional area of the inlet (e.g., the inlet geometry) of the exhaust turbine and the opening of the valve of the EGR system may be increased, resulting in a decrease in airflow through the engine during the engine braking event. As another example, when the demanded braking torque is medium, the cross-sectional area of the inlet of the turbine may be decreased (e.g., minimized) and the valve of the EGR system may be in an open position. As a further example, when the demanded braking torque is high, both the cross-sectional area of the inlet of the turbine may be decreased and the valve of the EGR system may be closed to provide increased airflow for engine braking. Thus, through coordinating adjustments of the valve of the EGR system and the cross-sectional area of the inlet of the turbine synergistically, the demanded braking torque may be achieved while decreasing an amount of airflow through the engine, which may result in maintenance of the catalyst above its light-off temperature during the engine braking event.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
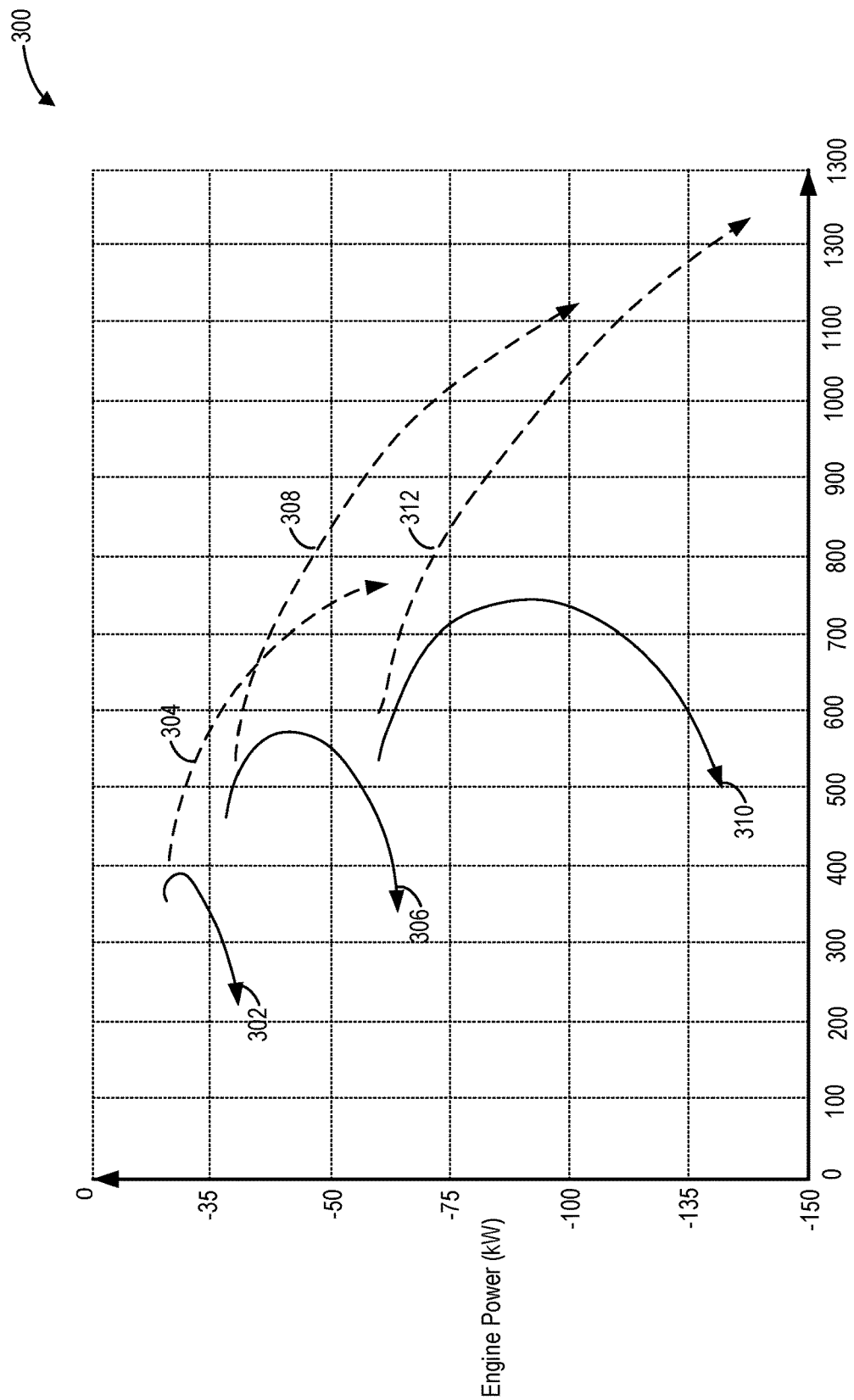
FIG. 3 shows a graph of engine power versus airflow mass for an engine operating at a plurality of different speeds.
Figure 4:
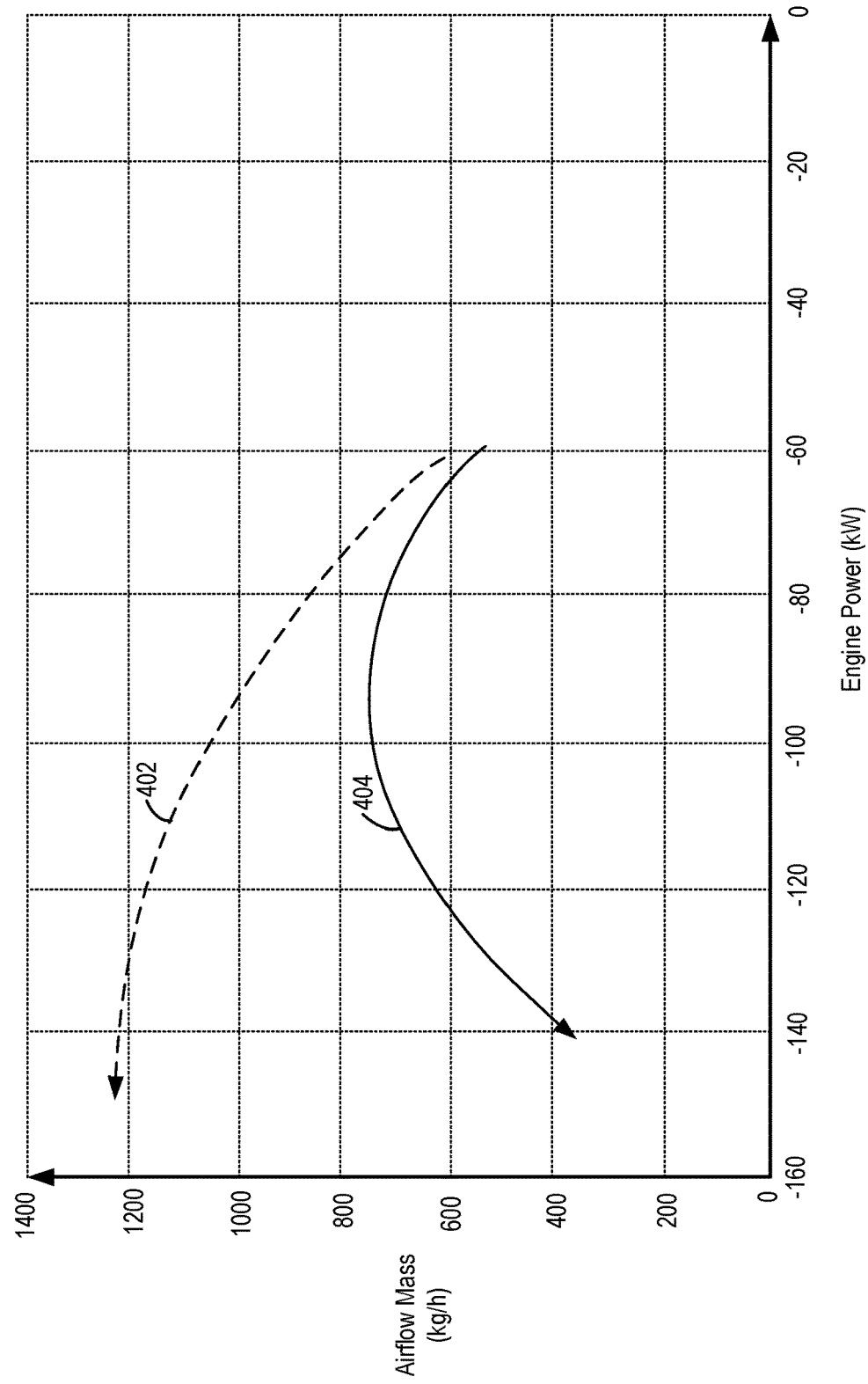
FIG. 4 shows a graph of airflow mass versus engine power for an engine operating at a single speed.
Figure 5:
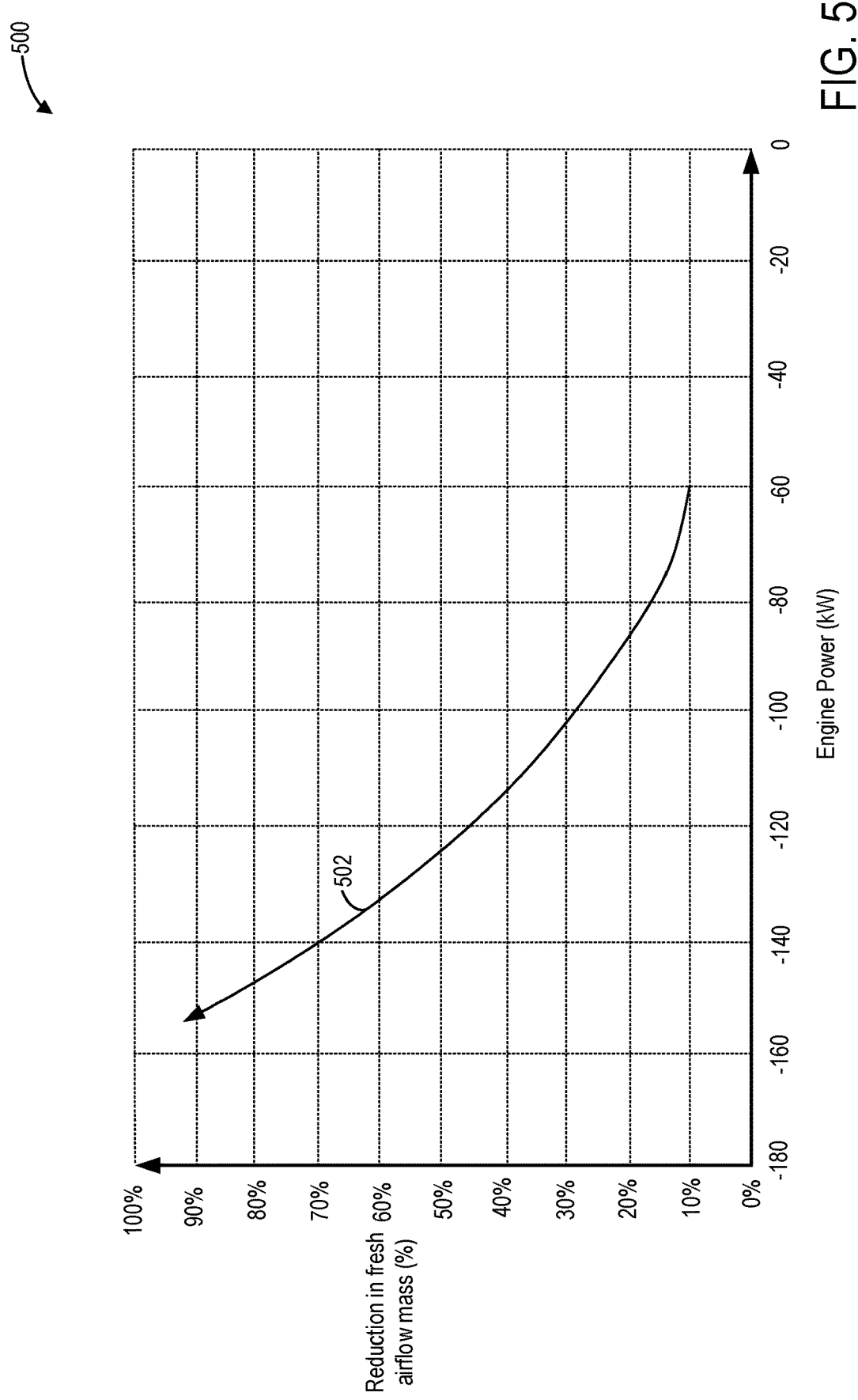
FIG. 5 shows a graph of reduction in fresh airflow mass versus engine power.
Figure 6A:
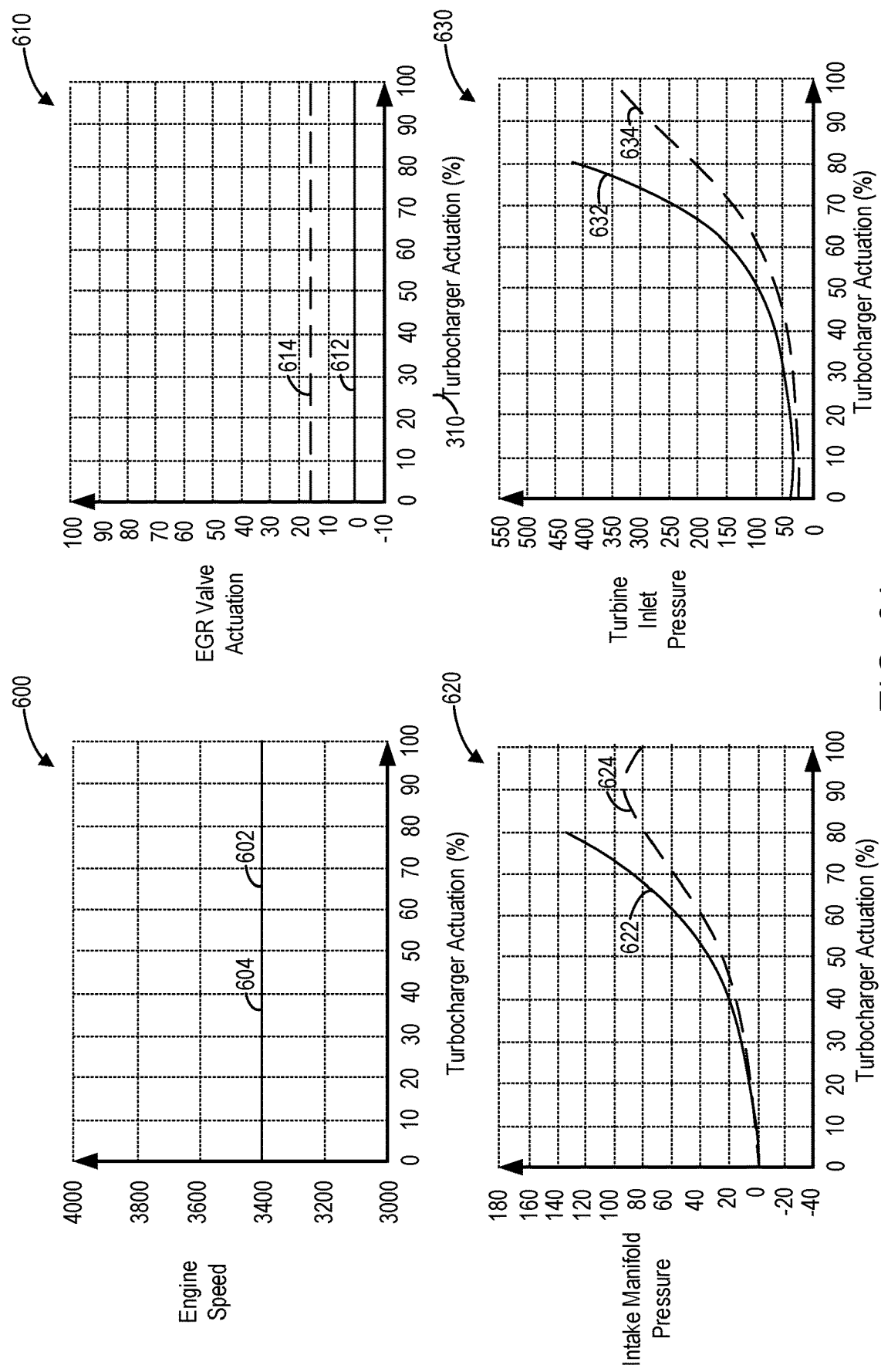
FIGS. 6A and 6B show an effect of a variable geometry turbocharger (VGT) opening and an exhaust gas recirculation (EGR) valve position on engine parameters during engine braking.
Figure 6B:
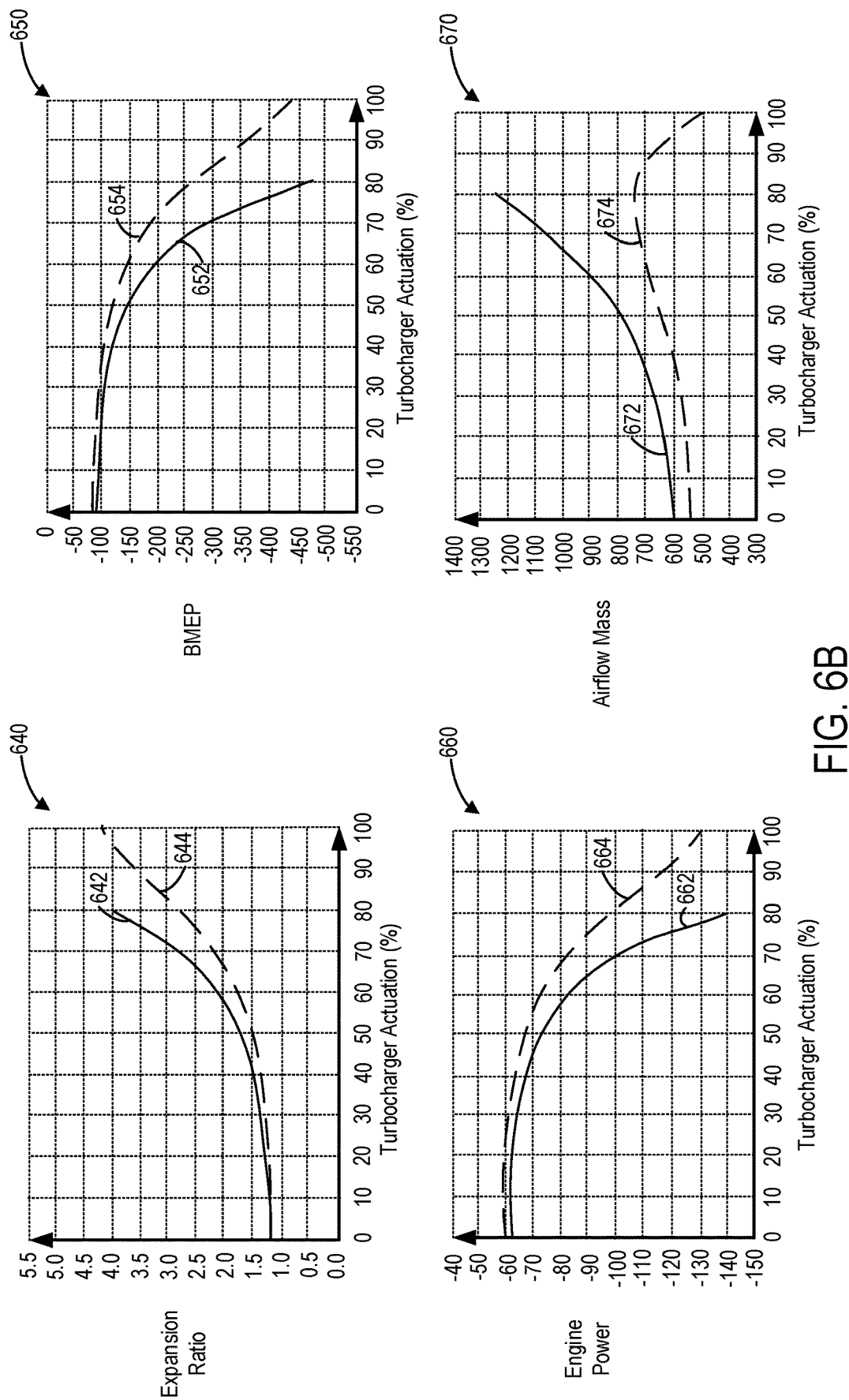
Figure 7:
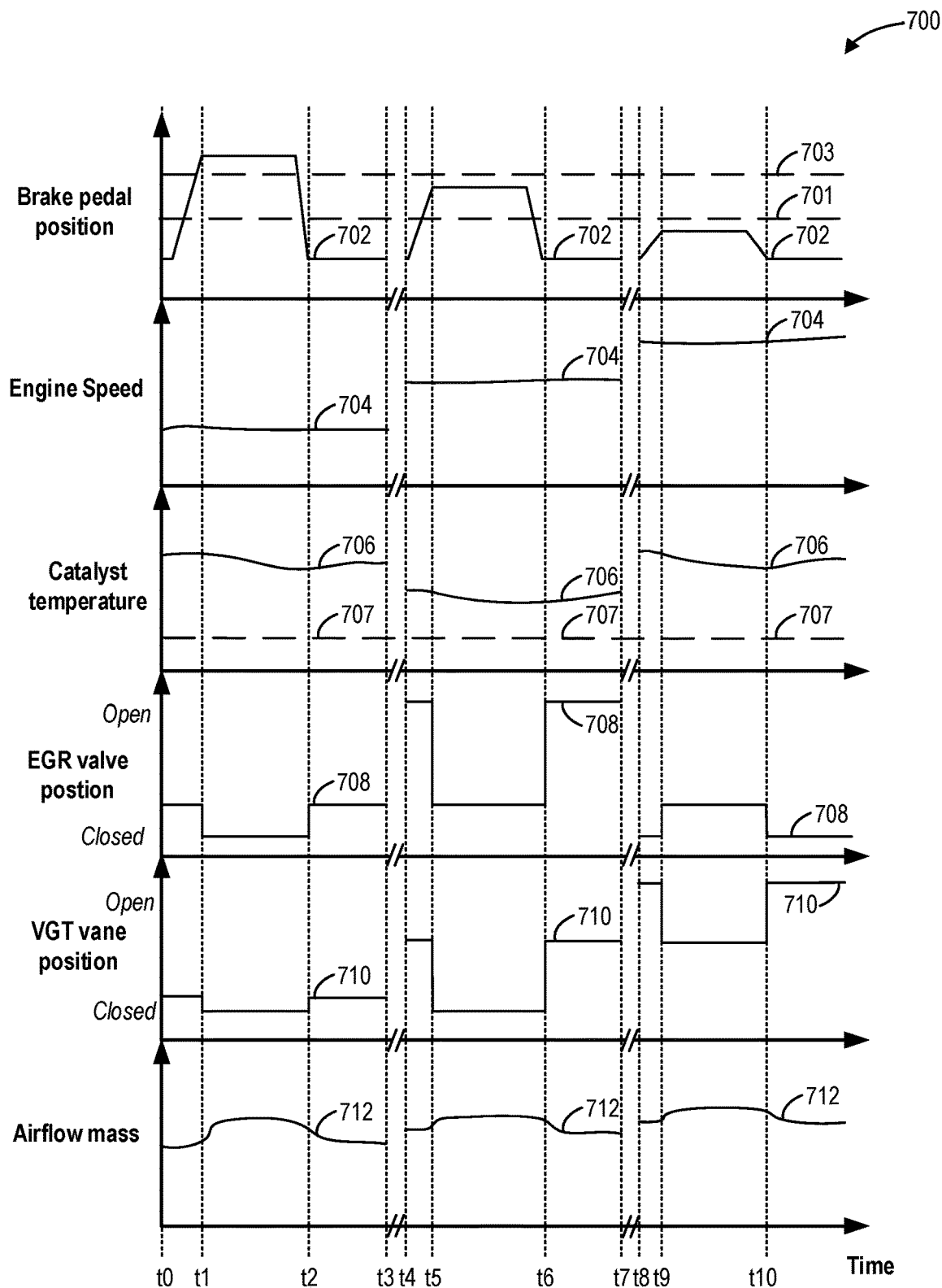
FIG. 7 shows an exemplary timeline of controlling an EGR valve and a VGT during engine braking.

The following description relates to systems and methods for engine braking of an engine. The engine may be the engine schematically shown in FIG. 1 that includes a variable geometry turbocharger (VGT) and a high pressure external exhaust gas recirculation (EGR) system. The VGT and the EGR system may be synergistically used to provide engine braking while maintaining an exhaust system (e.g., catalyst) temperature above its light-off temperature, such as according to the example method of FIG. 2. The positions of vanes of the VGT and an EGR valve of the EGR system affect an airflow mass and an engine power (e.g., engine braking power), as shown in FIGS. 3 and 4. Further, FIG. 5 shows the relationship between engine power and the reduction in fresh airflow mass across a plurality of VGT vane positions. FIGS. 6A and 6B show how a variety of engine operating conditions (e.g., intake manifold pressure, turbine inlet pressure, etc.) for an engine operating at a constant speed are affected by varying a position of the vanes of the VGT for two different EGR valve positions. Additionally, an example timeline for adjusting the VGT vanes and the EGR valve during engine braking is requested is shown in FIG. 7.

Figure 1:
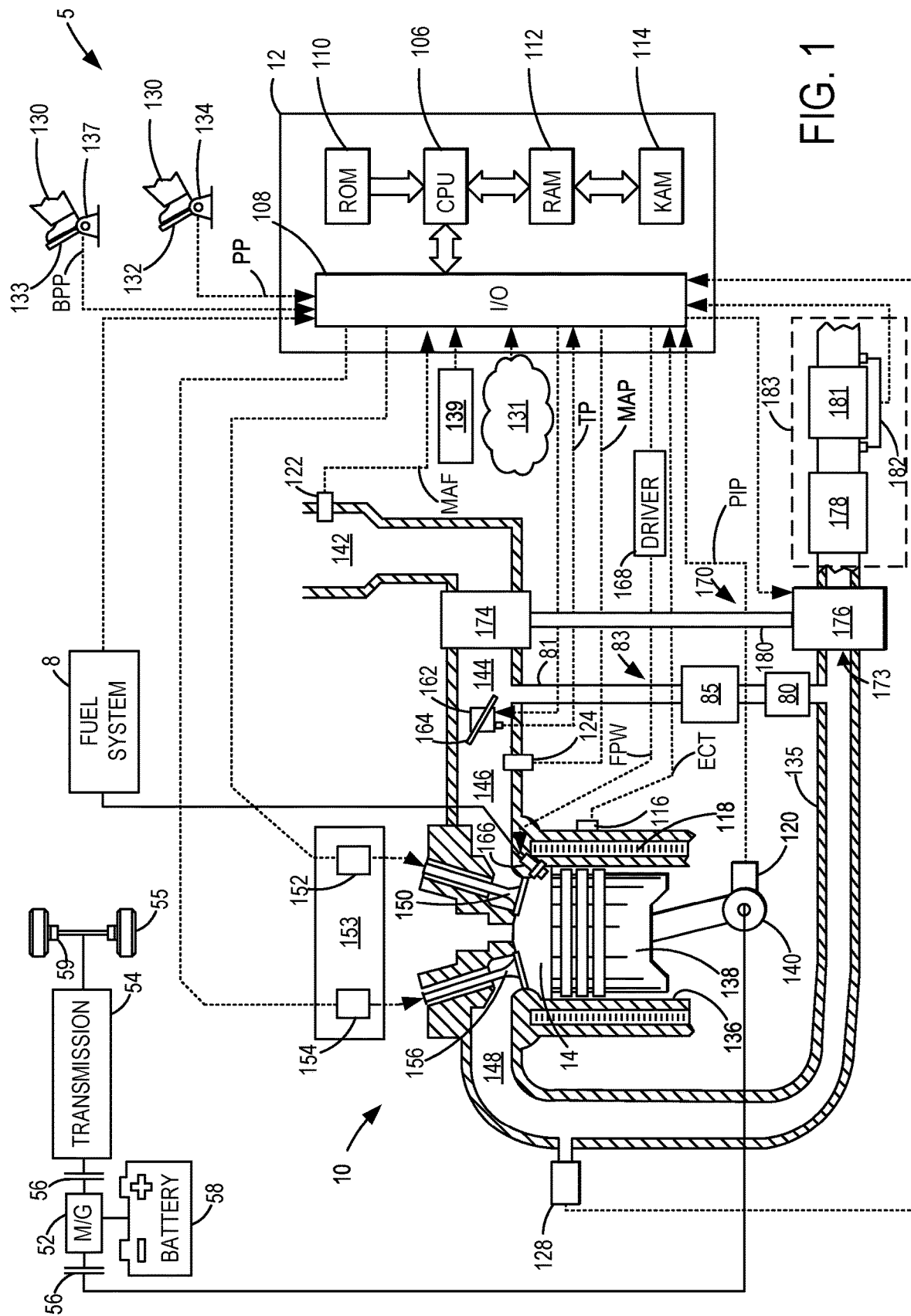
FIG. 1 schematically depicts an example cylinder of an internal combustion engine.

Turning now to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an accelerator pedal 132 and an accelerator pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator.

Vehicle wheels 55 may include mechanical brakes 59 to slow the rotation of vehicle wheels 55 in response to an engine braking request. Mechanical brakes 59 may include friction brakes, such as disc brakes or drum brakes, or electromagnetic (e.g., electromagnetically-actuated) brakes, for example, both friction brakes and electromagnetic brakes configured to slow the rotation of vehicle wheels 55, and thus the linear motion of vehicle 5. As an example, mechanical brakes 59 may include a hydraulic brake system comprising brake calipers, a brake servo, and brake lines configured to carry brake fluid between the brake servo and the brake calipers. Mechanical brakes 59 may be configured such that a braking torque applied to wheels 55 by the brake system varies according to the pressure of brake fluid within the system, such as within the brake lines. Furthermore, vehicle operator 130 may depress a brake pedal 133 to control an amount of braking torque supplied by mechanical brakes 59, such as by controlling the pressure of brake fluid within the brake lines, to slow vehicle 5 and/or hold vehicle 5 stationary. For example, a brake pedal position sensor 137 may generate a proportional brake pedal position signal BPP, which may be used to determine the amount of braking torque (e.g., braking power) requested by vehicle operator 130.

Cylinder 14 of engine 10 can receive intake air via a series of intake passages 142 and 144 and an intake manifold 146. Intake manifold 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger 170, including a compressor 174 arranged between intake passages 142 and 144 and an exhaust turbine 176 with an inlet 173 arranged along an exhaust passage 135. Compressor 174 may be at least partially powered by exhaust turbine 176 via a shaft 180 rotationally coupled to exhaust turbine 176.

In examples where turbocharger 170 is a variable geometry turbocharger (VGT), an effective aspect ratio of exhaust turbine 176 may be varied by controller 12 by adjusting a position of vanes arranged at inlet 173, which adjust an inlet geometry, of the exhaust turbine 176. By adjusting the position of the vanes, a cross-sectional area of inlet 173 of exhaust turbine 176 may be increased or decreased based on a desired airflow through the engine. For example, the cross-sectional area of inlet 173 of exhaust turbine 176 may be increased to decrease the airflow (such as at high engine speeds), and the cross-sectional area of inlet 173 of exhaust turbine 176 may be decreased to increase the airflow (such as at low engine speeds). Further, adjusting the position of the vanes adjusts a rotational speed of exhaust turbine 176, which in turn adjusts the rotational speed of shaft 180. For example, adjusting the vanes to decrease the cross-sectional area of inlet 173 of exhaust turbine 176 (e.g., closing the vanes) increases a flow velocity of gas entering exhaust turbine 176, thereby increasing the rotational speed of exhaust turbine 176 and shaft 180. As another example, adjusting the vanes to increase the cross-sectional area of inlet 173 of exhaust turbine 176 (e.g., opening the vanes) decreases a flow velocity of gas entering exhaust turbine 176, thereby retarding the rotational speed of exhaust turbine 176 and shaft 180.

During some braking events, where slowing of a vehicle by engine braking is requested, the vanes may be adjusted to a more closed position to decrease the cross-sectional area of inlet 173 of exhaust turbine 176. By adjusting the vanes to the more closed position, the flow of gas from the exhaust manifold into exhaust turbine 176 may be restricted, thereby increasing gas pressure in the exhaust manifold upstream of exhaust turbine 176, referred to herein as "backpressure." Backpressure may be leveraged for engine braking by exerting a force against piston movement in engine cylinders during an exhaust stroke. The force resisting piston movement may be a counterforce to the engine, resulting in increased pumping losses.

In some examples, a throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A throttle position sensor may be provided to measure a position of throttle plate 164. However, in other examples, engine 10 may not include throttle 162.

An exhaust manifold 148 can receive exhaust gases from other cylinders of engine 10 in addition to cylinder 14. An exhaust gas sensor 128 is shown coupled to exhaust manifold 148 upstream of exhaust aftertreatment system 183. Exhaust gas sensor 128 may be a temperature sensor positioned to measure a temperature of the exhaust gases. In the example shown, exhaust aftertreatment system 183 includes a diesel oxidation catalyst (DOC, also referred to herein simply as "catalyst") 178 and a diesel particulate filter (DPF) 181. DOC 178 may comprise a stainless-steel canister that contains a honeycomb structure (to increase surface area within DOC 178) coated with catalytic metals such as platinum or palladium. When exhaust gases such as carbon monoxide or hydrocarbons touch the inner surfaces of DOC 178, the gases are oxidized and may produce water and small amounts of carbon dioxide. DPF 181 may be a ceramic filter with a honeycomb structure used to capture particulate matter (e.g., soot). After capturing soot, DPF 181 is heated to high temperatures (e.g., around 600 Kelvin) by the exhaust gases to oxidize and burn the soot within DPF 181. In some examples, exhaust aftertreatment system 183 may additionally or alternatively include devices such as a NOx trap and/or a selective catalytic reduction (SCR) system. Although exhaust gas sensor 128 is shown coupled upstream of DOC 178, in other examples, exhaust gas sensor 128 may be coupled between DOC 178 and DPF 181, downstream of DPF 181, or in one or more or each of the three locations.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown) and/or camshaft position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cylinder deactivation valve control (CDVC), cam profile switching (CPS), variable cam timing (VCT), variable valve timing (VVT), variable valve lift (VVL), and/or a continuous variable valve lift (CVVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system). Actuator 152 and/or actuator 154 may be included in a decompression device 153. In one example, decompression device 153 may be the CVVL system and may be used to control valve lift during engine braking, such as to release compressed gas from cylinder 14 by opening exhaust valve 156 near top dead center. In other examples, decompression device 153 may be another type of compression release engine brake, such as a Jacobs (e.g., Jake) brake.

Cylinder 14 can have a compression ratio, which is a ratio of volumes when piston 138 is at bottom dead center (BDC) to top dead center (TDC). In one example, the compression ratio is in the range of 14:1 to 25:1. However, in some examples, such as where different fuels are used, the compression ratio may be increased.

In some examples, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to a fuel pulse width (FPW) signal received from controller 12 via an electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such above the piston between intake valve 150 and exhaust valve 156. Alternatively, the injector may be located overhead and near the intake valve to increase mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

It will be appreciated that in an alternative embodiment, fuel injector 166 may be a port injector providing fuel into the intake port upstream of cylinder 14. Further, while the example embodiment shows fuel injected to the cylinder via a single injector, the engine may alternatively be operated by injecting fuel via multiple injectors, such as one direct injector and one port injector. In such a configuration, the controller may vary a relative amount of injection from each injector.

Fuel may be delivered by fuel injector 166 to the cylinder during a single cycle of the cylinder. Furthermore, for a single combustion event, multiple injections of the delivered fuel may be performed per cycle. The multiple injections may be performed during the compression stroke, intake stroke, or any appropriate combination thereof.

Fuel tanks in fuel system 8 may hold fuels of different fuel types, such as fuels with different fuel qualities and different fuel compositions. The differences may include different cetane numbers, different heats of vaporization, different fuel blends, different additives, and/or combinations thereof, etc. A few examples of different fuels include diesel as a first fuel type, biodiesel as a second fuel type, and kerosene as a third type. Moreover, fuel characteristics of one or all fuel tanks may vary frequently, for example, due to day to day variations in tank refilling, and/or seasonally, such as due to different seasonal fuel blends. However, in an alternative embodiment, engine 10 is a gasoline engine, and the fuels held in fuel system 8 may include one or more gasoline blends.

External exhaust gas recirculation (EGR) may be provided to the engine via a high pressure EGR system 83, delivering exhaust gas from a zone of higher pressure in exhaust passage 135 to a zone of lower pressure in intake manifold 44, via an EGR passage 81. However, in other examples, EGR system 83 may be a low pressure EGR system, where EGR passage 81 is coupled between exhaust passage 135 downstream of turbine 176 and intake passage 142 upstream of compressor 174. In still other examples, both high pressure EGR and low pressure EGR loops may be included.

An amount EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is maximally enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically activated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through an EGR cooler 85 within EGR passage 81. EGR cooler 85 may reject heat from the EGR gases to engine coolant, for example.

Under some conditions, EGR system 83 may be used to control a temperature of an air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate an EGR mass flow. EGR sensors may be arranged within EGR passage 81 and may provide an indication of one or more of mass flow, pressure, and temperature of the exhaust gas, for example. An amount of EGR requested may be based on engine operating conditions, including engine load (as estimated via accelerator pedal position sensor 134), engine speed (as estimated via a crankshaft acceleration sensor), engine temperature (as estimated via an engine coolant temperature sensor 116), etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution request, and further correlates the change in the dilution request with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to EGR valve 80 (e.g., as sent to the stepper motor or other valve actuation device) as the output. Furthermore, EGR valve 80 may be adjusted based on a desired airflow and engine power during engine braking, which will be described with respect to FIG. 2.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including the signals previously discussed and additionally including a measurement of inducted mass airflow (MAF) from a mass airflow sensor 122; an engine coolant temperature (ECT) from temperature sensor 116 coupled to a cooling sleeve 118; a profile ignition pickup signal (PIP) from a Hall effect sensor 120 (or other type) coupled to crankshaft 140; a temperature signal from exhaust gas sensor 128, which may be used by controller 12 to determine the temperature of the exhaust gas; a signal from an exhaust differential pressure sensor 182 that measures a pressure difference across DPF 181; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, upon receiving a signal from accelerator pedal position sensor 134 or brake pedal position sensor 137 indicating that braking is requested, controller 12 may discontinue fueling to cylinder 14 by discontinuing signal FPW from electronic driver 168 so that fuel is not delivered via fuel injector 166 and may further adjust EGR valve 80 and vanes of exhaust turbine 176, such as will be described below with respect to FIG. 2.

Controller 12 may be communicatively coupled to other vehicles or infrastructures using appropriate communications technology. For example, controller 12 may be coupled to other vehicles or infrastructures via a wireless network 131, which may comprise Wi-Fi, Bluetooth, a type of cellular service, a wireless data transfer protocol, and so on. Controller 12 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Information exchanged between vehicles may be either directly communicated between vehicles or may be multi-hop. In some examples, longer range communications (e.g., WiMax) may be used in place of or in conjunction with V2V or V2I2V to extend the coverage area by a few miles. In still other examples, controller 12 may be communicatively coupled to other vehicles or infrastructures via wireless network 131 and the internet (e.g., the cloud). Vehicle 5 may also include an on-board navigation system 139 (for example, a Global Positioning System, or GPS). Navigation system 139 may include one or more location sensors for assisting in estimating vehicle speed, vehicle altitude, vehicle position/location, etc. For example, information from wireless network 131 and navigation system 139 may be additionally used by controller 12 to automatically drive vehicle 5 in self-driving cars.

As described above, FIG. 1 shows only one cylinder of a multi-cylinder engine. As such, each cylinder may similarly include its own set of intake/exhaust valves, fuel injector(s), etc. It will be appreciated that engine 10 may include any suitable number of cylinders, including 2, 3, 4, 5, 6, 8, 10, 12, or more cylinders in various configurations. Further, each of these cylinders can include some or all of the various components described and depicted by FIG. 1 with reference to cylinder 14.

Figure 2:
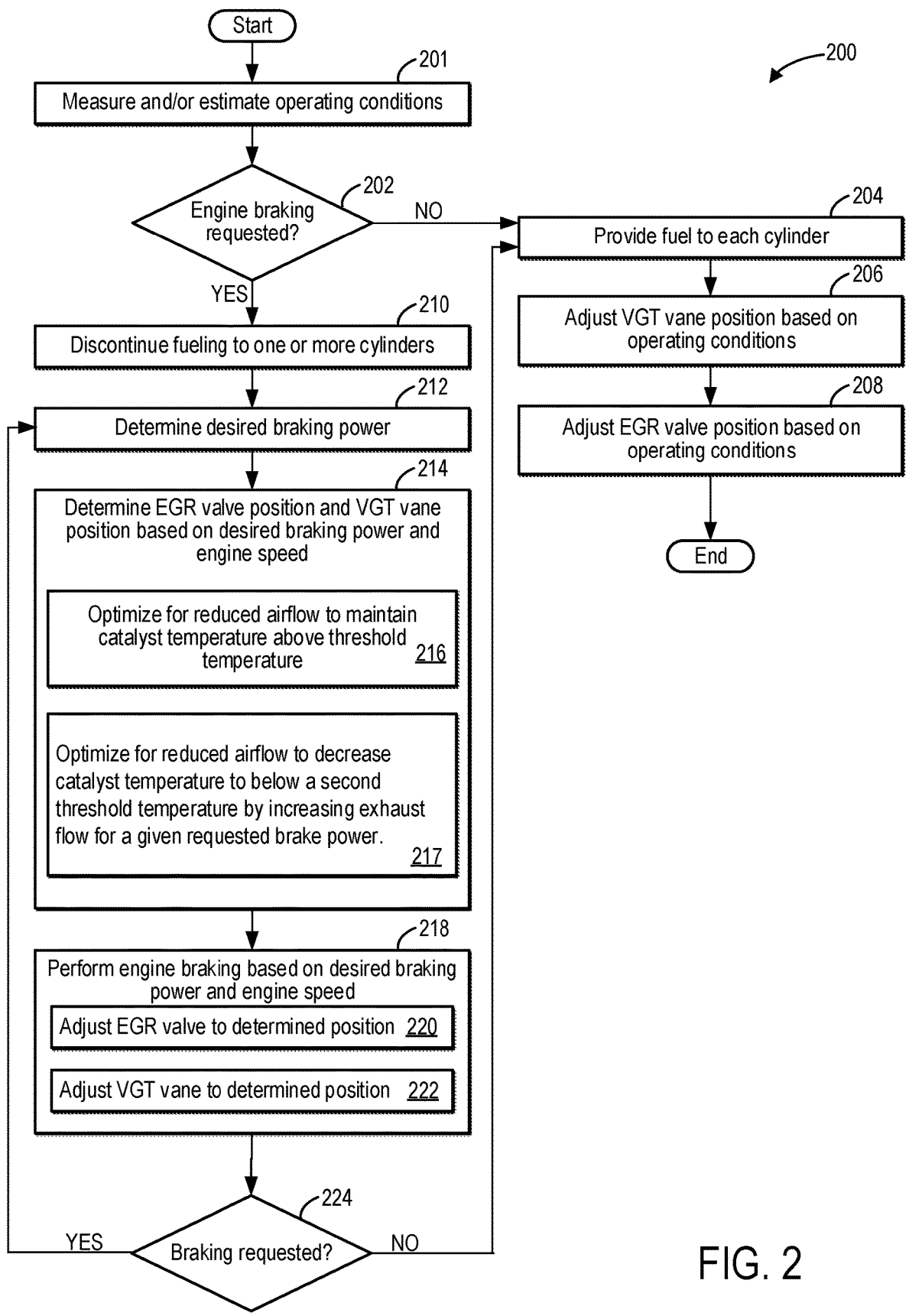
FIG. 2 depicts a flowchart for a method to control airflow through the engine during engine braking.

Turning to FIG. 2, a method 200 is shown for performing engine braking of a vehicle engine by adjusting a position of vanes at an inlet of a turbine of a VGT and a position of an EGR valve based on a desired braking power and a desired airflow mass. For example, the engine may be engine 10 of vehicle 5 of FIG. 1. As a further example, the VGT may be turbocharger 170 with inlet 173 of exhaust turbine 176 shown in FIG. 1, and the EGR valve may be EGR valve 80 of EGR system 83 also shown in FIG. 1. Instructions for carrying out method 200 may be executed by a controller (e.g., controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation according to method 200 described below.

At 201, method 200 includes measuring and/or estimating operating conditions. The operating conditions may include both engine and vehicle operating conditions. The engine operating conditions may include, for example, a current engine speed, an intake manifold pressure (e.g., MAP), an airflow mass of intake air provided to the engine, an engine temperature, a torque demand, a boost demand, a fuel injection amount and timing, cylinder valve lift and timing settings, an exhaust gas temperature and/or exhaust system temperature, an ambient temperature, a brake pedal position, an accelerator pedal position, etc. As one example, the brake pedal position and the accelerator pedal position may be determined based on signals received from respective pedal position sensors (e.g., brake pedal position sensor 137 and accelerator pedal position sensor 134 of FIG. 1, respectively). Together, the accelerator pedal position and the brake pedal position may be used by the controller to determine a torque demand, which may be a positive torque demand or a negative (e.g., braking) torque demand, which may be referred to herein as braking power.

At 202, method 200 includes determining if an engine braking event is requested. For example, the engine braking event may be requested responsive to a change in one or more of the accelerator pedal position and the brake pedal position. As an example, the engine braking event may be requested responsive to a tip-out event, where the accelerator pedal position changes from a depressed position to an undepressed, neutral position, or a less depressed position. As another example, the engine braking event may be requested responsive to the brake pedal position increasing (e.g., being further depressed). As still another example, the engine braking event may be requested responsive to a decrease in the demanded torque and/or in response to a non-zero requested braking power (e.g., brake torque), as determined from the accelerator pedal position and the brake pedal position. Further, the engine braking event may be requested when the engine speed is greater than a threshold engine speed. The threshold engine speed may be a predetermined, non-zero engine speed stored in memory below which further slowing the engine (e.g., via engine braking) may result in the engine inadvertently shutting off.

If at 202 the engine braking event is not requested, method 200 continues to 204 and includes providing fuel to each cylinder. As such, combustion may occur in each cylinder to produce the demanded torque. As an example, the controller may determine a pulse-width of a fuel signal to send to a fuel injector of each cylinder (e.g., signal FPW shown in FIG. 1) based on the demanded torque and/or an amount of air inducted into the engine, such as by using a look-up table, algorithm or map that relates the demanded torque and/or the amount of air inducted into the engine to the pulse-width of the fuel signal. Further, the controller may transmit the fuel signal of the determined pulse-width to the corresponding fuel injector at a determined timing for producing the demanded torque, for example. In particular, the determined timing may be at or near top dead center (TDC) of the compression stroke.

At 206, method 200 includes adjusting the VGT vane position based on the operating conditions. For example, the vanes of the VGT, located at an inlet of an exhaust turbine of the VGT (e.g., turbine 176 of FIG. 1), may be further opened to increase a cross-sectional area of an inlet of the exhaust turbine, allowing more exhaust flow through the turbine and thereby decreasing an exhaust backpressure. As another example, the VGT vanes may be further closed, decreasing the cross-sectional area of the inlet of the exhaust turbine, to increase the rotational speed of the turbine, such as to increase an amount of boost provided when the exhaust gas production is otherwise insufficient to meet the boost demand at a current turbine aspect ratio. Thus, a geometry of the VGT turbine may be adjusted to provide a desired amount of boost based on the operating conditions.

At 208, method 200 includes adjusting the EGR valve position based on the operating conditions. For example, the opening of the valve of the EGR system may be adjusted based on the engine load, the current engine speed, the engine temperature, etc. For example, the controller may refer to a look-up table having the engine speed and load as the input, and the look-up table may output a desired EGR valve position corresponding to the input engine speed. In another example, the controller may determine the EGR valve position through logic rules that directly take into account parameters such as the engine load, the engine speed, the engine temperature, etc. In still other examples, the controller may rely on a model that correlates a change in the engine load with a change in a dilution request, and further correlates the change in the dilution request with a change in the position of the EGR valve. The controller may further determine the EGR valve position by taking into account a best fuel economy mapping for a desired dilution rate. The controller may adjust the EGR valve by sending a signal corresponding to a desired degree of opening to apply to the EGR valve to a stepper motor or other valve actuation device.

Method 200 may then end. For example, method 200 may be repeated at a pre-determined frequency during vehicle operation. As another example, method 200 may be repeated responsive to a detected change in one or more operating conditions, such as when a change of the brake pedal position is detected, for example.

Returning to 202, if the engine braking event is requested, method 200 continues to 210 and includes discontinuing fueling to one or more cylinders. In some examples, fueling is discontinued to every cylinder of the engine (e.g., discontinuing combustion in the engine) for a transient fuel shut-off (TFSO) operation, wherein fueling is temporarily shut off to the entire engine while the vehicle speed is decreasing. In other examples, a portion of the cylinders may remain fueled while fueling is discontinued to the one or more cylinders so that the engine continues to produce torque. In other examples still, fuel is discontinued in at least one cylinder. As an example, the controller may determine a number of cylinders to operate unfueled based on the requested (e.g., demanded) braking power of the engine braking request, such as by inputting the requested braking power into a look-up table, algorithm, or map stored in memory, which may output the number of cylinders to operate unfueled. As another example, the controller may make a logical determination regarding the number of cylinders to operate unfueled based on logic rules that are a function of the requested braking power. In general, an amount of engine braking provided may increase as the number of unfueled cylinders increases. For example, as the engine braking request increases (e.g., an increase in the amount of braking power) the number of unfueled cylinders may increase. As another example, as the engine braking request decreases (e.g., a decrease in the amount of braking power), the number of unfueled cylinders may decrease. To discontinue fueling to the determined number of the one or more cylinders, the controller may discontinue sending the FPW signal to the fuel injector of each of the one or more cylinders.

At 212, method 200 includes determining a desired braking power. The desired braking power may be determined by the accelerator pedal position or the brake pedal position. For example, when the brake pedal position is more depressed an increased amount of braking power (e.g., engine braking request increases) is desired. As another example, when the accelerator pedal position is decreased (e.g., less depressed), an increased amount of braking power may be desired. As a further example, in vehicles with automated driving, including autonomous and semi-autonomous vehicles, the controller may determine a braking power based on environmental conditions (e.g., location and speed of other vehicles, stops lights/signs, pedestrians, etc.) that the vehicle senses.

At 214, method 200 includes determining the EGR valve position and the VGT vane position based on the desired braking power and the engine speed. The position of the EGR valve may affect the airflow through the engine and therefore affects the amount of braking power. For example, with the EGR valve in a fully closed valve position, the airflow through the engine is increased resulting in the engine braking power increasing due to a higher exhaust backpressure. As another example, with the EGR valve in an open position (e.g., a partially open valve position or fully open valve position), the recirculation of exhaust gases causes the airflow through the engine to be decreased, and in some examples (e.g., depending also on the VGT vane position and engine speed) results in a decreased engine braking power. The desired braking power and the engine speed may be input into a lookup-table, algorithm, and/or map, which may then output a desired position of the EGR valve. For example, the map may resemble the graphs shown in FIGS. 3 and 4, which are described below.

In addition to the EGR valve, the VGT vane position affects the airflow through the engine, which subsequently affects the amount of braking power. For example, when the VGT vanes are in a closed position (e.g., a fully closed vane position), the cross-sectional area of the inlet of the exhaust turbine is decreased and the airflow through the engine is increased (e.g., due to a higher boost pressure), resulting an increased braking power (e.g., due to a higher exhaust backpressure). As a further example, when the VGT vanes are in an open position (e.g., partially open or fully open), the cross-sectional area of the inlet of the exhaust turbine is increased and the airflow through the engine is decreased (e.g., due to a lower boost pressure), resulting in the amount of braking power to be decreased (e.g., due to a lower exhaust backpressure). However, if the EGR valve is partially open, as the VGT vanes become more closed, generated braking power increases while airflow through the engine is decreased, as will be described with respect to FIGS. 3 and 4.

In an embodiment, determining the EGR valve position and the VGT vane position further includes optimizing for reduced airflow to maintain the exhaust system (e.g., catalyst) temperature above a threshold temperature, as depicted at 216. For example, the threshold temperature may be a non-zero value stored within a memory of the controller. As an example, the threshold temperature may be a light-off temperature of the catalyst, and as such, if the catalyst is below the threshold temperature, the catalyst may not be able to efficiently treat emissions from the engine once the braking event has ended and emissions are generated upon engine combustion resuming or increasing. An increased airflow through the engine during the braking event decreases the temperature of the catalyst. The desired airflow may be determined by the controller inputting the desired braking and the given engine speed into a look-up table, algorithm, and/or function, which then may output a desired airflow, which may be a lowest possible airflow, for the engine braking event that may maintain the catalyst temperature above the threshold temperature.

In an embodiment, determining the EGR valve position and the VGT vane position further alternatively or additionally includes optimizing for increased airflow to maintain the exhaust system (e.g., catalyst) temperature below a threshold temperature, such as a maximum allowed temperature, as depicted at 217. For example, the maximum temperature threshold may be a non-zero value stored within a memory of the controller, and may be substantially greater than the light-off temperature. Here, the system takes advantage of increasing flow to aid in cooling for a given requested brake power. An increased airflow through the engine during the braking event decreases the temperature of the catalyst. The desired airflow may be determined by the controller inputting the desired braking and the engine speed into a look-up table, algorithm, and/or function, which then may output a desired airflow, which may be a highest possible airflow, for the engine braking event that may maintain the catalyst temperature below the maximum temperature.

In an example, the method may wait for engine braking request power to be greater than zero, measure exhaust temperature, and look up desired exhaust temperature, at a desired location in the exhaust system. Then, from the difference in actual and desired temperature determine whether heating or cooling of the system is to be scheduled. For cooling, increased exhaust flow is requested, whereas for heating reduced exhaust flow is requested. As described herein, the system determines the EGR and VGT position that give the desired braking power and exhaust flow. If the goal is to heat the exhaust system, the routine finds the VGT/EGR position with minimum exhaust flow. This maps to most open EGR valve position. If the goal is to cool the exhaust system, the routine maps it to the most closed EGR valve position. If brake power requested goes to zero, the routine can release control of EGR and VGT. Further details of example operation are described below.

In an example, the EGR valve position and VGT vane position may be determined by the desired airflow. For example, the desired airflow, engine speed, and braking power may be inputted into a look-up table, algorithm, and/or function which outputs both an EGR valve position and a VGT vane position. For example, if the desired braking power and engine speed is low, the VGT vane position and the EGR valve position may both be in open positions resulting in decreased airflow through the engine to maintain the catalyst temperature above the threshold temperature. As another example, if the desired braking power and engine speed is high, the VGT vane position may be maintain closed and the EGR valve may be partially open, resulting in an increased amount of braking power but a decreased amount of airflow (as is shown below in FIGS. 3 and 4).

In some examples, the EGR valve position and the EGR vane position may be determined based on a first threshold torque (e.g., engine power) and a second threshold torque. For example, the first threshold torque may be a value stored within the memory of the controller and may be an engine torque that, if the desired braking power is below the first threshold torque, the EGR valve may be adjusted to or maintained in an open position during the engine braking event, and the VGT vane position may be adjusted to or maintained in an open position during the engine braking event. The second threshold torque, for example, may be a value stored within the memory of the controller and may be a greater torque than the first threshold torque. For example, if the desired braking power is above the second threshold torque, both the EGR valve and the VGT vane position may be adjusted to or maintained closed. As a further example, if the desired braking power is above the first threshold torque and below the second threshold torque the EGR valve may be desired to be in an open position while the VGT vane position is adjusted to or maintained in a closed position.

Additionally, in some examples, the controller may input the engine speed, desired braking power, and desired airflow into a look-up table, algorithm, and/or function stored in memory, which outputs an EGR valve position. A position of the VGT vanes may be determined by the position of the EGR valve. In other example, the engine speed, desired braking power, and desired airflow may be inputted into a look-up table, algorithm, and/or function which outputs a VGT vane position. In such examples, a position of the EGR valve may be determined by the position of the EGR valve.

As a further example, the controller may input the desired braking power into a look-up table, algorithm, and/or function stored in memory, which may output a position for the EGR valve. The controller may take into account the braking power generated by adjusting the EGR valve position in determining a position for the VGT vanes. For example, the controller may subtract a first braking power generated by the EGR valve position from the desired braking power to determine a second braking power to be generated by the VGT vane position. As another example, the first braking power may be generated by the VGT vane position and the second braking power (determined from the first braking power) may be generated by the EGR valve position.

At 218, method 200 includes performing engine braking based on the desired braking power and the engine speed. Performing engine braking includes adjusting the EGR valve to the determined position, as indicated at 220. For example, the EGR valve may be adjusted to a more open or more closed position by the controller electronically activating a solenoid coupled to the EGR valve. As another example, the controller may adjust the EGR valve position by actuating a stepper motor coupled to the EGR valve.

Performing engine braking further includes adjusting the VGT vane position to the determined position, as indicated at 222. For example, the controller may actuate the VGT vanes by sending the signal to an actuator of the VGT that corresponds to the desired position. As a further example, the VGT vanes may be adjusted from an open position to a more closed position, and vice versa, based on the determined position.

At 224, method 200 includes determining if the engine braking event continues to be requested. The controller may determine if the engine braking event is requested similarly to 202 of method 200. As an example, the engine braking event may be continued to be requested if the brake pedal position remains depressed and/or the accelerator pedal position remains undepressed. Alternatively, the engine braking event may no longer be requested if the brake pedal position is undepressed, and/or the accelerator pedal position is depressed (e.g., further depressed), indicating a positive engine torque is requested (e.g., braking power is not requested).

If, at 224, engine braking is still requested, method 200 continues to 212 to determine the desired braking power, as described above. The desired braking power may be the same or different (e.g., more or less) as the already determined braking power. Additionally, as described above, an EGR valve position and a VGT valve position are determined and optimized for reduced airflow through the engine (e.g., at 214 and 216) and adjusted to the determined positions (220 and 222, respectively).

If, at 224, engine braking is not requested, method 200 proceeds to 204 and includes providing fuel to each cylinder (e.g., cylinder fueling may be resumed in cylinders where cylinder fueling was discontinued), which is further described above. Furthermore, the VGT vane position (e.g., at 206) and the EGR valve position (e.g., at 208) are adjusted based on operating conditions, as described above. Method 200 may then end.

In this way, the EGR valve and VGT vanes may be used synergistically to adjust the amount of engine braking provided while also decreasing catalyst cooling during the braking event. For example, by adjusting the EGR valve and VGT vanes based on the desired braking power and airflow through the engine, the adjusted EGR valves and VGT vanes may allow engine braking to occur while also maintaining the catalyst temperature above the threshold temperature. As a result of maintaining the catalyst temperature above the threshold temperature, the catalyst remains at an efficient temperature to treat emissions from the engine when combustion in the engine is resumed.

Turning to FIG. 3, an example graph 300 shows a relationship between engine power (e.g., as shown on the vertical axis) and engine airflow (e.g., airflow mass, as shown on the horizontal axis) across a plurality of VGT vane positions, referred to herein as a VGT sweep, for two EGR valve positions. For example, the EGR valve may be EGR valve 80 of the engine 10 shown in FIG. 1, and the VGT may be turbocharger 170. Plots 302, 306, and 310 display the engine power for a given airflow mass while the EGR valve is maintained at 15% open throughout the VGT sweep while plots 304, 308, and 312 display the engine power for a given airflow mass while the EGR valve is maintained closed (e.g., 0% open) throughout the VGT sweep. In all of the plots, the VGT vane position is actuated to a further closed position in the direction of the arrow such that the VGT vane is fully closed at the position of the arrowhead. Plots 302 and 304 correspond to an engine speed of 2000 RPM, plots 306 and 308 correspond to an engine speed of 2600 RPM, and plots 310 and 312 correspond to an engine speed of 3400 RPM.

The horizontal axis represents airflow mass through the engine in kilograms per hour (kg/h). A range from 0 to 1300 kg/h is shown is shown on the horizontal axis. The vertical axis represents engine power in kilowatts (kW). A range from 0 to −150 kW is shown on the vertical axis, where 0 is at the top of the vertical axis and −150 is at the bottom of the vertical axis. Negative engine power values denote braking power, with the amount of braking power increasing as the value becomes more negative. As an example, the engine power at 500 kg/h for plot 310 is approximately −130 kW, which is a greater braking power than at 600 kg/h which is approximately −125 kW.

At lower engine speeds, braking power for a given airflow mass is generally lower than at higher engine speeds. For example, comparing plot 302, which includes operating the engine at 2000 RPM with the EGR valve open 15%, and plot 306, which includes operating the engine at 2600 RPM with the EGR valve open at 15%, shows the engine power ranging from approximately −20 to −30 kW at the lower engine speed (plot 302) and from −27 to −70 kW at the higher engine speed (plot 306). Increased braking power at higher engine speeds may be due to the increased rotations of the engine pumping more air through the engine (e.g., increasing the airflow mass), creating more pumping work. Furthermore, increasing the engine speed increases the airflow mass that may be achieved.

For the plots showing the EGR maintained in the closed position (e.g., plots 304, 308, and 312), increasing the airflow mass generally results in increasing the engine braking power. Furthermore, decreasing an openness of the VGT vanes (e.g., in the direction of the arrowhead) increases the airflow mass through the engine, therefore increasing engine braking power. For example, for plot 308 when the airflow mass is at approximately 540 kg/h (e.g., the lowest airflow mass value for plot 308), the VGT vanes may be in a fully or nearly fully open position. As another example, when the airflow mass is at approximately 1225 kg/h for plot 308 (e.g., the highest airflow mass value for plot 308), the VGT vanes may be in a fully or nearly fully closed position. A similar trend (e.g., when the VGT vanes are closed, the airflow mass is highest and when the VGT vanes are open, the airflow mass is lowest) is seen for all plots where the EGR valve is maintained closed.

For plots showing the EGR valve maintained at 15% open (e.g., plots 302, 306, and 310), increasing the airflow mass initially results in increasing engine braking power; however, as the VGT vane becomes further closed, each plot curves such that the engine braking power increases with decreasing airflow mass. This is a result of the engine braking power being determined by flow through the turbine and back pressure (e.g., exhaust manifold pressure). Closing the VGT vanes reduces the turbine flow while increasing back pressure; however, the effects are not independent of the EGR valve opening. For example, increased braking power can be achieved by either closing or opening the VGT vanes when the EGR valve is maintained at 15%. In this way, high engine braking power may still be achieved with reduced airflow mass by maintaining the VGT vane position closed while the EGR valve is maintained at 15% open. Thus, with the reduced airflow, less cold air is pumped though the engine and the aftertreatment device may be maintained above its light-off temperature during engine braking.

FIG. 4 shows an example graph 400 of a relationship between engine airflow (e.g., airflow mass, as shown on the vertical axis) and engine power (e.g., as shown on the horizontal axis) across a plurality of VGT vane positions (e.g., a VGT sweep) for two EGR valve open amounts. In particular, a dashed plot 402 depicts the relationship between the engine airflow and the engine power when the EGR valve is maintained at 0% open throughout the VGT sweep, while a solid plot 404 depicts the relationship between the engine airflow and the engine power when the EGR valve is maintained at 15% open during the VGT sweep. Further, graph 400 depicts engine operation at a constant speed (e.g., 3400 RPM). In both plots, the VGT vane position is actuated to a further closed position in the direction of the arrow such that the VGT vane is fully closed at the position of the arrowhead. Negative engine power values denote braking power, with the amount of braking power increasing as the value becomes more negative.

As illustrated by both of dashed plot 402 and solid plot 404, the braking power increases as the VGT vanes are further closed for both EGR valve open amounts. However, the different EGR valve open amounts result in different airflow mass values for a same amount of engine braking and similar VGT vane positions. Further, a difference between the airflow mass values produced by the different EGR valve open amounts generally increases as the VGT vane becomes further closed. For example, the airflow mass through the engine is approximately 700 kg/h when the EGR valve is 15% open (solid plot 404) and approximately 850 kg/h when the EGR valve is 0% open (dashed plot 402) at approximately −80 kW of engine power. As another example, at approximately −140 kW of engine power, the airflow through the engine is less than 400 kg/h when the EGR valve is 15% open (solid plot 404) and greater than 1200 kg/h when the EGR valve is 0% open. Although operating with the EGR valve fully closed (e.g., 0% open) and the VGT vane fully closed may provide higher braking power than can be achieved when operating with the EGR valve 15% open, operating with the EGR valve partially open (e.g., 15% open) and the VGT vane fully closed may provide relatively high braking power (e.g., −140 kW of engine power) while substantially reducing airflow through the engine compared to when the EGR valve is fully closed.

This reduction in engine airflow is further exemplified in FIG. 5, which shows an example graph 500 relating the reduction in a fresh airflow mass (e.g., shown on the vertical axis as a percentage) to engine power (e.g., shown on the horizontal axis) for operating with the EGR valve 15% open relative to 0% open during VGT sweeps at a constant engine speed. Similar to that described above with respect to FIG. 4, the VGT vane position is actuated to a further closed position in the direction of the arrow on a plot 502 such that the VGT vane is fully closed at the position of the arrowhead.

As depicted by plot 502, the reduction in the fresh airflow mass for operating with the EGR valve 15% open compared to 0% open is greatest at the highest engine braking power (e.g., the most negative engine power), which corresponds to operating with the VGT vane fully closed. However, even a 10% reduction in the airflow mass is achieved at an engine power of −60 kW, showing that the EGR valve position can be used to modulate airflow through the engine during engine braking in addition to VGT vane position adjustments.

Turning now to FIGS. 6A and 6B, graphs depicting how various operating conditions change in relation to a variable geometry turbocharger actuation percentage are shown for an engine operating at 3400 RPM. For example, the turbocharger may be the turbocharger 170 in FIG. 1. In FIG. 6A, an engine speed is shown in a graph 600, an EGR valve opening is shown in a graph 610, an intake manifold pressure is shown in a graph 620, and a turbine inlet pressure is shown in a graph 630. In FIG. 6B, an expansion ratio is shown in a graph 640, a brake mean effective pressure (BMEP) is shown in a graph 650, an engine power is shown in a graph 660, and an airflow mass is shown in a graph 670.

For all of the above, the horizontal axes show a percentage turbocharger actuation. For example, when the turbocharger actuation is 0%, vanes within the turbocharger are in a fully open position, and when the turbocharger actuation is 100%, the turbocharger vanes are in a fully closed position. Additionally, each graph contains two plots depicting two different EGR valve positions. The plot with the solid line in each graph represents operating with the EGR valve fully closed (e.g., 0% open). The plot with the dashed line in each graph represents operating with the EGR valve partially open (e.g., 15% open). With the EGR valve fully closed, the turbocharger actuation may not surpass 80% so that pressure upstream of a turbine of the turbocharger does not cause degradation the turbine, which is reflected in the graphs.

Starting with graph 600, the engine speed (in RPM) is shown on the vertical axis with a range from 3000 RPM to 4000 RPM. For both a solid plot 602 and a dashed plot 604 (e.g., EGR valve 0% open and 15% open, respectively), the engine speed is 3400 RPM. Note that because the solid plot 602 entirely overlaps with the dashed plot 604, the solid plot 602 obscures the dashed plot 604. Furthermore, the engine speed is maintained at 3400 RPM for all the turbocharger actuation positions (e.g., from 0% to 100%). Although all operating conditions are shown for an engine operating at an engine speed of 3400 RPM, it may be understood that similar trends may occur for different engine speeds.

For graph 610, the EGR valve opening (in percentages) is shown on the vertical axis with a range of −10% to 100%. The EGR valve may not be able to be in a position where the EGR valve is at −10%. The range is shown to start at −10% to illustrate a plot 612 at a 0% EGR valve opening. A dashed plot 614 shows 15% EGR valve opening for all turbocharger actuations.

Graph 620 shows the intake manifold pressure on the vertical axis with a range from −40 kilopascal (kPa) to 180 kPa. A plot 622 shows the intake manifold pressure for the EGR valve at 0% opening, and a dashed plot 624 shows the intake manifold pressure for the EGR valve at 15% opening. At 0% actuation for the turbocharger (e.g., the turbocharger vanes are open), both plot 622 and dashed plot 624 (e.g., 0% and 15% EGR valve openings, respectively) are at 0 kPa. As the turbocharger vanes decrease in openness, the intake manifold pressure increases for both plot 622 and dashed plot 624. However, the intake manifold pressure increases more rapidly for plot 622 (0% EGR valve opening) than for dashed plot 624 (15% EGR valve opening). For dashed plot 624, the intake manifold pressure begins to decrease at around 90% turbocharger actuation such that the intake manifold pressure at 80% turbocharger actuation and 100% turbocharger actuation are equal (e.g., 80 kPa).

The turbine inlet pressure (in kPa) is shown on the vertical axis of graph 630 with a range from 0 kPa to 550 kPa. A plot 632 shows the turbine inlet pressure for the EGR valve at 0% opening, and a dashed plot 634 shows the turbine inlet pressure for the EGR valve at 15% opening. At 0% turbocharger actuation, the turbine inlet pressure for plot 632 (0% EGR valve opening) is approximately 40 kPa while the turbine inlet pressure for dashed plot 634 (15% EGR valve opening) is smaller at approximately 25 kPa. As the turbocharger actuation increases (e.g., the turbocharger vanes decrease in openness), the turbine inlet pressure increases for both plots; however, plot 632 (EGR valve 0% open) experiences a greater increase than dashed plot 634 (EGR valve 15% open). For example, for the turbocharger actuation at 80% (the maximum value for plot 632), the turbine inlet pressure reaches 425 kPa for plot 632 and 200 kPa for dashed plot 634.

Graph 640 shows the expansion ratio on the vertical axis with a range of 0.0 to 5.5. A plot 642 shows the expansion ratio for the EGR valve at 0% opening, and a dashed plot 644 shows the expansion ratio for the EGR valve at 15% opening. At 0% turbocharger actuation, the expansion ratio is around 1.25 for both plot 642 (0% EGR valve opening) and dashed plot 644 (15% EGR valve opening). Similar to the previous graphs, as the turbocharger actuation increases, the expansion ratio for both plots increases with plot 642 increasing more rapidly.

The BMEP is shown in graph 650 with the vertical axis in a range from −550 bar to 0 bar. The absolute value of the BMEP increases as the vertical axis decreases. A plot 652 shows the BMEP for the EGR valve at 0% opening, and a dashed plot 644 shows the BMEP for the EGR valve at 15% opening. At 0% turbocharger actuation, the BMEP for plot 652 is around −90 bar and for plot 654 around −75 bar. As the turbocharger vanes decrease in openness, the BMEP for plots 654 and 652 decreases (e.g., becomes more negative, but increases in absolute value). Plot 652 decreases in BMEP more rapidly than plot 654.

Engine power is shown on the vertical axis of graph 660 in a range from −40 kW to −150 kW. Negative values of the engine power indicate a braking torque (e.g., braking power). A plot 662 shows the engine power for the EGR valve at 0% opening, and a dashed plot 664 shows the engine power for the EGR valve at 15% opening. Increasing the turbocharger actuation results in a decrease in engine power (e.g., engine power becomes more negative) for both plot 662 and dashed plot 664. When the EGR valve maintained closed (plot 662), the decrease in engine power as turbocharger actuation increases is greater than the decrease in engine power when the EGR valve is maintained partially open (plot 664). Furthermore, as the turbocharger actuation increases, the differences in the amount of engine power increases between plots 662 and 664. For example, at 20% turbocharger actuation, the difference in engine power between plot 662 and dashed plot 664 is approximately 2 kW, but at 80% turbocharger actuation the difference in engine power between plot 662 and dashed plot 664 is approximately 40 kW.

Graph 670 shows airflow mass on the vertical axis in a range from 300 kg/h to 1400 kg/h. A plot 672 shows the airflow mass for the EGR valve at 0% opening, and a dashed plot 674 shows the airflow mass for the EGR valve at 15% opening. For plot 672 (e.g., EGR valve 0% open), the airflow mass increases as the turbocharger actuation increases. For example, at 0% turbocharger actuation, plot 672 has an airflow mass of 600 kg/h and increases to 1250 kg/h at 80% turbocharger actuation. Dashed plot 674 (EGR valve 15% open), increases in airflow mass less rapidly than plot 672, and at around 80% turbocharger actuation, the airflow mass starts to decrease such that by 100% turbocharger actuation, the airflow mass at 100% turbocharger actuation (500 kg/h) is less than the airflow mass at 0% turbocharger actuation (around 550 kg/h). Such results are desirable for maintaining a temperature of a catalyst during engine braking.

As shown from graphs 660 and 670, maintaining the EGR valve closed (plots 662 and 672) results in more engine braking power than maintaining the EGR valve partially open (15% open), and more airflow mass, which may cause the catalyst to cool undesirably during the braking event. In comparison, maintaining the EGR valve at 15% open (plots 664 and 674), results in less engine braking power, but also less airflow mass, especially at high turbocharger actuations. Therefore, a controller may adjust the EGR valve to a partially open position to reduce the airflow mass if able to meet a demanded engine braking power, but may adjust the EGR valve to the fully closed position if unable to meet the demanded engine braking power with the EGR valve partially open, such as described with respect to FIG. 2.

FIG. 7 shows a prophetic example timeline 700 of adjusting VGT vanes and an EGR valve while performing engine braking. For example, the VGT vanes may be a part of turbocharger 0, and the EGR valve may be EGR valve 80, both shown in FIG. 1. A first threshold torque is shown by dashed line 701, a brake pedal position is shown in a plot 702, a second threshold torque is shown by dashed line 703, an engine speed is shown in a plot 704, a catalyst temperature is shown in a plot 706, a threshold temperature is shown by a dashed line 707, an EGR valve position is shown in a plot 708, a VGT vane position is shown in a plot 710, and an airflow mass is shown in a plot 712.

For all of the above, the horizontal axis represents time, with time increasing along the horizontal axis from left to right. The vertical axis represents each labeled parameter. For plots 702, 704, 706, and 712, the labeled parameter increases up the vertical axis from bottom to top. For example, in plot 702, the brake pedal position increases up the vertical axis in the direction of the arrow, such as due to the brake pedal being further depressed by a vehicle operator. For plots 708 and 710, increasing up the vertical axis indicates increasing an amount of openness. For example, the EGR valve position (plot 708) may be fully open, as indicated by "open" at the top of the vertical axis, fully closed, as indicated by "closed" at the bottom of the vertical axis, or in a position between open or closed (e.g., partially open). Similarly, for plot 710, the VGT vane position may be fully closed, fully open, or in a position between fully opened and fully closed. Furthermore, dashed line 707 shows the threshold temperature which may be a non-zero number stored within a memory of a controller (e.g., controller 12 shown in FIG. 1) and may correspond to a light-off temperature of the catalyst. For example, if the temperature of the catalyst (plot 706) is below the threshold temperature, the catalyst may not efficiently treat emissions from the engine. Thus, it is desirable to maintain the catalyst temperature above the threshold temperature.

Additionally, the first threshold torque may be a value stored within the memory of the controller and may be an engine torque that, if the desired braking power is below the first threshold torque, the EGR valve may be adjusted to or maintained in an open position during the engine braking event, and the VGT vane position may be adjusted to or maintained in an open position during the engine braking event. The second threshold torque, for example, may be a value stored within the memory of the controller and may be a greater torque than the first threshold torque. For example, if the desired braking power is above the second threshold torque, both the EGR valve and the VGT vane position may be adjusted to or maintained closed. As a further example, if the desired braking power is above the first threshold torque and below the second threshold torque the EGR valve may be adjusted to or maintained in an open position while the VGT vane position is adjusted to or maintained in a closed position.

From time t0 to time t1, the brake pedal position (plot 702) increases in response to being depressed by the vehicle operator. The engine speed (plot 704) is low (e.g., around 2000 to 2500 RPM), which results in the EGR valve (plot 708) being in a partially open position (e.g., almost closed) and the VGT vanes (plot 710) to be in a partially open (e.g., almost closed) position in order to provide high intake air boost to the cylinders. In response to the brake pedal position increasing, engine braking is requested at time t1, and fueling to at least one cylinder within the engine may be discontinued. Further, the braking demand is above the second threshold torque. In response to the demanded braking power being above the second threshold torque, both the EGR valve and the VGT vane positions are decreased to a fully closed position at time t1 to increase the airflow mass (plot 712) through the engine, which provides an increased braking power to fulfill the high braking power demand.

From time t1 to time t2, the brake pedal position remains depressed, resulting in the EGR valve and the VGT vanes remaining closed to help provide the engine braking. Furthermore, due to the increase in airflow mass from time t1 to t2, the catalyst temperature decreases, but remains above the threshold temperature. As such, if fueling were to commence in the engine, the catalyst would be able to effectively treat exhaust emissions.

At time t2, the brake pedal position is no longer depressed, resulting in engine braking no longer being desired. In response, fueling is resumed in the cylinders of the engine, the EGR valve changes from closed to a partially open position to provide recirculated exhaust gas, and the VGT vanes are changed from the closed position to a partially open position, causing airflow through the engine to decrease. As a result of the decreased airflow and fueling within the cylinders being resumed, the catalyst temperature increases after time t2.

An elapse in time occurs between time t3 to time t4, as indicated by the breaks in the horizontal (e.g., time) axes. The elapse may be seconds, minutes, hours, days, weeks, etc. For example, time t3 may occur during a same or different vehicle trip than time t4. Thus, in some examples, the vehicle may be continuously operated between time t3 and time t4, while in other examples, one or a plurality of vehicle trips may occur between time t3 and time t4.

From time t4 to time t5, the brake pedal position (plot 702) increases (e.g., becomes more depressed), indicating a request for braking. Additionally, from time t4 to time t5, the engine speed (plot 704) is at a mid engine speed (e.g., 2500 RPM to 3500 RPM). As a result, the VGT vane position (plot 710) is partially open (e.g., halfway open) to increase airflow to the engine without causing increased backpressure, and the EGR valve position (plot 708) is open (e.g., fully or near fully open). At time t5, in response to a desire for engine braking and with the desired engine braking torque being above the first threshold torque and below the second threshold torque, fueling is discontinued in some or all of the cylinders, the VGT vane position is changed from partially open to closed, and the EGR valve position is changed from the fully open position to a partially open position (e.g., around 15% open). With the EGR valve at a partially open position and the VGT vane position fully closed, a greater braking power may be achieved without increasing the airflow mass enough to decrease the catalyst temperature (plot 706) below the threshold temperature (dashed line 707) throughout the engine braking. At time t6, the brake pedal position is no longer depressed, indicating an end to engine braking. In response, fueling is resumed in the cylinders, the EGR valve returns to the fully open or nearly fully open position, and the VGT vanes change from closed to half way open (e.g., 50% open). As a result, airflow mass through the engine decreases and the catalyst temperature increases.

A second elapse in time occurs between time t7 to time t8, as indicated by the breaks in the horizontal (e.g., time) axes. The elapse may be seconds, minutes, hours, days, weeks, etc. For example, time t7 may occur during a same or different vehicle trip than time t8. Thus, in some examples, the vehicle may be continuously operated between time t7 and time t8, while in other examples, one or a plurality of vehicle trips may occur between time t7 and time t8.

From time t8 to time t9, the engine speed (plot 704) is high (e.g., around 3500 RPM to 4500 RPM), and as a result, the EGR valve position is closed and the VGT vane position is fully open to prevent backpressure within the engine. Additionally, from time t7 to time t8, the brake pedal position increases, indicating a request for braking. Due to the brake pedal position plateauing below the first threshold torque, the desired braking power may be low and the EGR valve and VGT vane positions may both be in open positions for engine braking. At time t9, in response to the desired engine braking, fueling is discontinued (e.g., discontinued combustion) in some or all of the cylinders, the EGR valve is changed to a partially opened (e.g., around 15% open) position, and the VGT is partially closed (e.g., changed from fully open to around halfway open). As a result, the increase in airflow mass is enough to provide the desired braking and does not result in the catalyst temperature decreasing below the threshold temperature (dashed line 707). At time t10, the brake pedal position is no longer depressed, and braking is no longer desired. In response, fueling is resumed in the cylinders of the engine, the EGR valve returns to a closed position, and the VGT vane returns to a fully open position, resulting in a decreased airflow mass through the engine and the catalyst temperature to increase.

In this way, the EGR valve and VGT vanes may be used in combination to control airflow through the engine for engine braking. For example, by adjusting the EGR valve and VGT vanes based on a desired braking power and a desired airflow (e.g., airflow mass) through the engine, the adjusted EGR valves and VGT vanes may allow engine braking to occur while also maintaining the catalyst temperature above the threshold temperature. As a result of maintaining the catalyst temperature above the threshold temperature, the catalyst remains at an efficient temperature to treat emissions from the engine once combustion in the engine is resumed. Further, due to the reduced airflow during engine braking, engine braking may be provided for longer without the catalyst cooling below the efficient temperature, resulting in a decrease in vehicle emissions.

The technical effect of adjusting a position of an EGR valve and a position of VGT vanes in combination to control the airflow through the engine during engine braking is that a desired engine braking may be achieved while an amount of cooling of an exhaust aftertreatment system during the engine braking may be decreased.

The disclosure also provides support for a method, comprising: during an engine braking event in an engine: discontinuing combustion in the engine, generating a requested braking torque of the engine braking event by coordinating adjustments of both of a cross-sectional area of an inlet of an exhaust turbine and an opening of a valve of an exhaust gas recirculation (EGR) system to maintain an exhaust system temperature above a threshold temperature during the engine braking event. In a first example of the method, generating the requested braking torque of the engine braking event by coordinating adjustments of both of the cross-sectional area of the inlet of the exhaust turbine and the opening of the valve of the EGR system to maintain the exhaust system temperature above the threshold temperature during the engine braking event comprises: determining a desired opening position of the valve of the EGR system and a desired cross-sectional area of the inlet of the exhaust turbine based on the requested braking torque, a current engine speed, and a desired airflow through the engine during the engine braking event, adjusting the valve of the EGR system to the desired opening position, and adjusting the cross-sectional area of the inlet of the exhaust turbine to the desired cross-sectional area of the inlet of the exhaust turbine. In a second example of the method, optionally including the first example, determining the desired opening position of the valve of the EGR system and the desired cross-sectional area of the inlet of the exhaust turbine based on the requested braking torque, the current engine speed, and the desired airflow through the engine during the engine braking event comprises selecting a function that relates the requested braking torque to the desired airflow through the engine during the engine braking event based on the current engine speed. In a third example of the method, optionally including one or both of the first and second examples, adjusting the cross-sectional area of the inlet of the exhaust turbine comprises adjusting vanes at the inlet of the exhaust turbine. In a fourth example of the method, optionally including one or more or each of the first through third examples, the EGR system is a high pressure EGR system that flows exhaust gas from upstream of the inlet of the exhaust turbine to an intake passage of the engine, downstream of a compressor rotationally coupled to the exhaust turbine. In a fifth example of the method, optionally including one or more or each of the first through fourth examples, the exhaust system temperature is a temperature of an exhaust aftertreatment system, and the threshold temperature is a light-off temperature of the exhaust aftertreatment system. In a sixth example of the method, optionally including one or more or each of the first through fifth examples, coordinating the adjustments of both of the cross-sectional area of the inlet of the exhaust turbine and the opening of the valve of the EGR system to maintain the exhaust system temperature above the threshold temperature during the engine braking event comprises adjusting both of the cross-sectional area of the inlet of the exhaust turbine and the opening of the valve of the EGR system to reduce airflow through the engine during the engine braking event. In a seventh example of the method, optionally including one or more or each of the first through sixth examples, the cross-sectional area of the inlet of the exhaust turbine is adjusted via by adjusting vanes of the exhaust turbine, and wherein coordinating the adjustments of both of the cross-sectional area of the inlet of the exhaust turbine and the opening of the valve of the EGR system to maintain the exhaust system temperature above the threshold temperature during the engine braking event comprises: adjusting the vanes of the exhaust turbine to a partially open vane position and the opening of the valve of the EGR system to a first partially open valve position in response to the requested braking torque of the engine braking event being less than a first, lower threshold, adjusting the vanes of the exhaust turbine to a fully closed vane position and the opening of the valve of the EGR system to a second partially open valve position in response to the requested braking torque of the engine braking event being greater than or equal to the first, lower threshold and less than a second, higher threshold, and adjusting the vanes of the exhaust turbine to the fully closed vane position and the opening of the valve of the EGR system to a fully closed valve position in response to the requested braking torque of the engine braking event being greater than or equal to the second, higher threshold. In an eighth example of the method, optionally including one or more or each of the first through seventh examples, the partially open vane position is further closed as the requested braking torque of the engine braking event increases toward the first, lower threshold. In a ninth example of the method, optionally including one or more or each of the first through eighth examples, each of the first partially open valve position and the second partially open valve position are selected based on the requested braking torque to produce a lowest possible airflow through the engine during the engine braking event for a current engine speed and the cross-sectional area of the inlet of the exhaust turbine.

The disclosure also provides support for a method, comprising: during an engine braking event in an engine: discontinuing combustion in the engine, generating a requested braking torque of the engine braking event by coordinating adjustments of both of a cross-sectional area of an inlet of an exhaust turbine and an opening of a valve of an exhaust gas recirculation (EGR) system to reduce an exhaust system temperature to below a threshold temperature during the engine braking event. In a first example of the method, generating the requested braking torque of the engine braking event by coordinating adjustments of both of the cross-sectional area of the inlet of the exhaust turbine and the opening of the valve of the EGR system comprises: determining a desired opening position of the valve of the EGR system and a desired cross-sectional area of the inlet of the exhaust turbine based on the requested braking torque, a current engine speed, and a desired increased airflow through the engine during the engine braking event, adjusting the valve of the EGR system to the desired increased opening position, and adjusting the cross-sectional area of the inlet of the exhaust turbine to the desired cross-sectional area of the inlet of the exhaust turbine. In a second example of the method, optionally including the first example, determining the desired increased opening position of the valve of the EGR system and the desired cross-sectional area of the inlet of the exhaust turbine based on the requested braking torque, the current engine speed, and the desired increased airflow through the engine during the engine braking event comprises selecting a function that relates the requested braking torque to the desired airflow through the engine during the engine braking event based on the current engine speed. In a third example of the method, optionally including one or both of the first and second examples, adjusting the cross-sectional area of the inlet of the exhaust turbine comprises adjusting vanes at the inlet of the exhaust turbine. In a fourth example of the method, optionally including one or more or each of the first through third examples, the EGR system is a high pressure EGR system that flows exhaust gas from upstream of the inlet of the exhaust turbine to an intake passage of the engine, downstream of a compressor rotationally coupled to the exhaust turbine. In a fifth example of the method, optionally including one or more or each of the first through fourth examples, the exhaust system temperature is a temperature of an exhaust aftertreatment system, and the threshold temperature is a maximum temperature of the exhaust aftertreatment system.

The disclosure also provides support for a system, comprising: an engine, a variable geometry turbocharger (VGT) including a turbine coupled to an exhaust passage of the engine and a compressor coupled to an intake passage of the engine, an exhaust gas recirculation (EGR) passage coupled to the exhaust passage, upstream of the turbine, and the intake passage, downstream of the compressor, and a controller including instructions stored in non-transitory memory that, when executed, cause the controller to: provide engine braking by discontinuing combustion in the engine while adjusting both of a flow through the EGR passage and an inlet geometry of the turbine to reduce airflow through the engine during the engine braking for a requested braking power of the engine braking. In a first example of the system, the system further comprises: an EGR valve coupled to the EGR passage, and wherein adjusting the flow through the EGR passage comprises adjusting an opening of the EGR valve based on the requested braking power, a speed of the engine, and the inlet geometry of the turbine. In a second example of the system, optionally including the first example, the system further comprises: vanes configured to adjust the inlet geometry of the turbine and an EGR valve coupled to the EGR passage, and wherein to provide engine braking by discontinuing combustion in the engine while adjusting adjust both of the flow through the EGR passage and the inlet geometry of the turbine to reduce airflow through the engine during the engine braking for the requested braking power of the engine braking, the controller includes further instructions stored in the non-transitory memory that, when executed, cause the controller to: reference a map relating a generated braking power and a produced airflow through the engine at a plurality of different vane positions of the vanes and a plurality of different valve positions of the EGR valve for a given engine speed, and select a vane position of the plurality of different vane positions of the vanes and a valve position of the plurality of different valve positions that produces a smallest airflow through the engine for the given engine speed and the requested braking power, adjust the vanes to the selected vane position, and adjust the EGR valve to the selected valve position. In a third example of the system, optionally including one or both of the first and second examples, the opening of an EGR valve and the inlet geometry of the are increased responsive to a decrease in the requested braking power of the engine braking, and wherein the opening of the EGR valve and the inlet geometry of the turbine are decreased responsive to an increase in the requested braking power of the engine braking.

In another representation, a method includes responsive to an engine braking request: deactivating fueling to at least one cylinder of an engine; adjusting an opening of an exhaust gas recirculation (EGR) valve based on both of a requested braking torque of the engine braking request and a desired airflow through the engine during the engine braking request; and adjusting an effective flow area of a turbine inlet of a variable geometry turbocharger (VGT) based on both of the requested braking torque of the engine braking request and the opening of the EGR valve. The method may include that adjusting the effective flow area of the turbine inlet of the VGT based on both of the requested braking torque of the engine braking request and the opening of the EGR valve comprises further decreasing the effective flow area of the turbine inlet of the VGT as the requested braking torque of the engine braking request increases and as a portion of the requested braking torque of the engine braking request provided by adjusting the opening of the EGR valve decreases. In combination with any of the above, the method may include that adjusting the effective flow area of the turbine inlet of the VGT based on both of the requested braking torque of the engine braking request and the opening of the EGR valve comprises further increasing the effective flow area of the turbine inlet of the VGT as the requested braking torque of the engine braking request decreases and as a portion of the requested braking torque of the engine braking request provided by adjusting the opening of the EGR valve increase. In combination with any of the above, the method may include that the opening of the EGR valve increases in response to one or both of the requested braking torque of the engine braking request decreasing and the desired airflow through the engine during the engine braking request decreasing. In combination with any of the above, the method may include that the opening of the EGR valve decreases in response to one or both of the requested braking torque of the engine braking request increasing and the desired airflow through the engine during the engine braking request increasing. In combination with any of the above, the method may include that the desired airflow through the engine during the engine braking request decreases as a desired exhaust system temperature during the engine braking request increases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   during an engine braking event in an engine:
      discontinuing combustion in the engine; and
      generating a requested braking torque of the engine braking event by coordinating adjustments of both of a cross-sectional area of an inlet of an exhaust turbine and an opening of a valve of an exhaust gas recirculation (EGR) system to maintain an exhaust system temperature above a threshold temperature during the engine braking event, wherein the cross-sectional area of the inlet of the exhaust turbine is adjusted via by adjusting vanes of the exhaust turbine, and wherein coordinating the adjustments of both of the cross-sectional area of the inlet of the exhaust turbine and the opening of the valve of the EGR system to maintain the exhaust system temperature above the threshold temperature during the engine braking event comprises:
         adjusting the vanes of the exhaust turbine to a partially open vane position and the opening of the valve of the EGR system to a first partially open valve position in response to the requested braking torque of the engine braking event being less than a first, lower threshold;
         adjusting the vanes of the exhaust turbine to a fully closed vane position and the opening of the valve of the EGR system to a second partially open valve position in response to the requested braking torque of the engine braking event being greater than or equal to the first, lower threshold and less than a second, higher threshold; and
         adjusting the vanes of the exhaust turbine to the fully closed vane position and the opening of the valve of the EGR system to a fully closed valve position in response to the requested braking torque of the engine braking event being greater than or equal to the second, higher threshold.

2. The method of claim 1, wherein generating the requested braking torque of the engine braking event by coordinating adjustments of both of the cross-sectional area of the inlet of the exhaust turbine and the opening of the valve of the EGR system to maintain the exhaust system temperature above the threshold temperature during the engine braking event comprises:
   determining a desired opening position of the valve of the EGR system and a desired cross-sectional area of the inlet of the exhaust turbine based on the requested braking torque, a current engine speed, and a desired airflow through the engine during the engine braking event;
   adjusting the valve of the EGR system to the desired opening position; and
   adjusting the cross-sectional area of the inlet of the exhaust turbine to the desired cross-sectional area of the inlet of the exhaust turbine.

3. The method of claim 2, wherein determining the desired opening position of the valve of the EGR system and the desired cross-sectional area of the inlet of the exhaust turbine based on the requested braking torque, the current engine speed, and the desired airflow through the engine during the engine braking event comprises selecting a function that relates the requested braking torque to the desired airflow through the engine during the engine braking event based on the current engine speed.

4. The method of claim 2, wherein adjusting the cross-sectional area of the inlet of the exhaust turbine comprises adjusting vanes at the inlet of the exhaust turbine.

5. The method of claim 1, wherein the EGR system is a high pressure EGR system that flows exhaust gas from upstream of the inlet of the exhaust turbine to an intake passage of the engine, downstream of a compressor rotationally coupled to the exhaust turbine.

6. The method of claim 1, wherein the exhaust system temperature is a temperature of an exhaust aftertreatment system, and the threshold temperature is a light-off temperature of the exhaust aftertreatment system.

7. The method of claim 1, wherein coordinating the adjustments of both of the cross-sectional area of the inlet of the exhaust turbine and the opening of the valve of the EGR system to maintain the exhaust system temperature above the threshold temperature during the engine braking event comprises adjusting both of the cross-sectional area of the inlet of the exhaust turbine and the opening of the valve of the EGR system to reduce airflow through the engine during the engine braking event.

8. The method of claim 1, wherein the partially open vane position is further closed as the requested braking torque of the engine braking event increases toward the first, lower threshold.

9. The method of claim 1, wherein each of the first partially open valve position and the second partially open valve position are selected based on the requested braking torque to produce a lowest possible airflow through the engine during the engine braking event for a current engine speed and the cross-sectional area of the inlet of the exhaust turbine.

10. A method, comprising:
during an engine braking event in an engine:
discontinuing combustion in the engine;
generating a requested braking torque of the engine braking event by coordinating adjustments of both of a cross-sectional area of an inlet of an exhaust turbine and an opening of a valve of an exhaust gas recirculation (EGR) system to reduce an exhaust system temperature to below a threshold temperature during the engine braking event, wherein the exhaust system temperature is a temperature of an exhaust aftertreatment system, and the threshold temperature is a maximum temperature of the exhaust aftertreatment system.

11. The method of claim 10, wherein generating the requested braking torque of the engine braking event by coordinating adjustments of both of the cross-sectional area of the inlet of the exhaust turbine and the opening of the valve of the EGR system comprises:
determining a desired opening position of the valve of the EGR system and a desired cross-sectional area of the inlet of the exhaust turbine based on the requested braking torque, a current engine speed, and a desired increased airflow through the engine during the engine braking event;
adjusting the valve of the EGR system to the desired increased opening position; and
adjusting the cross-sectional area of the inlet of the exhaust turbine to the desired cross-sectional area of the inlet of the exhaust turbine.

12. The method of claim 11, wherein determining the desired increased opening position of the valve of the EGR system and the desired cross-sectional area of the inlet of the exhaust turbine based on the requested braking torque, the current engine speed, and the desired increased airflow through the engine during the engine braking event comprises selecting a function that relates the requested braking torque to the desired airflow through the engine during the engine braking event based on the current engine speed.

13. The method of claim 11, wherein adjusting the cross-sectional area of the inlet of the exhaust turbine comprises adjusting vanes at the inlet of the exhaust turbine.

14. The method of claim 10, wherein the EGR system is a high pressure EGR system that flows exhaust gas from upstream of the inlet of the exhaust turbine to an intake passage of the engine, downstream of a compressor rotationally coupled to the exhaust turbine.

15. A system, comprising:
an engine;
a variable geometry turbocharger (VGT) including a turbine coupled to an exhaust passage of the engine and a compressor coupled to an intake passage of the engine;
an exhaust gas recirculation (EGR) passage coupled to the exhaust passage, upstream of the turbine, and the intake passage, downstream of the compressor; and
a controller including instructions stored in non-transitory memory that, when executed, cause the controller to:
provide engine braking by discontinuing combustion in the engine while adjusting both of a flow through the EGR passage and an inlet geometry of the turbine to reduce airflow through the engine during the engine braking for a requested braking power of the engine braking;
adjust vanes of the VGT to a partially open vane position and open a valve of along the EGR passage to a first partially open valve position in response to the requested braking torque being less than a first, lower threshold;
adjust the vanes of the VGT to a fully closed vane position and open the valve along the EGR passage to a second partially open valve position in response to the requested braking torque being greater than or equal to the first, lower threshold and less than a second, higher threshold; and
adjust the vanes of the VGT to the fully closed vane position and open the valve along the EGR passage to a fully closed valve position in response to the requested braking torque being greater than or equal to the second, higher threshold.

16. The system of claim 15, further comprising additional instructions that cause the controller to adjust the valve along the EGR passage in further response to a speed of the engine and the inlet geometry of the turbine.

17. The system of claim 15, further comprising additional instructions that cause the controller to adjust the valve along the EGR passage and the inlet geometry of the turbine responsive to a decrease in the requested braking power of the engine braking.

* * * * *